(12) United States Patent
Wang

(10) Patent No.: US 7,860,985 B2
(45) Date of Patent: Dec. 28, 2010

(54) METHOD FOR SYNCHRONIZING CONNECTION STATE IN DATA COMMUNICATION, AND COMMUNICATION NODE USING THE SAME

(75) Inventor: Ju Wang, Zhejiang Province (CN)

(73) Assignee: Hangzhou H3C Technologies Co., Ltd., Hangzhou, Zhejiang Province (CN)

( * ) Notice: Subject to any disclaimer, the term of this patent is extended or adjusted under 35 U.S.C. 154(b) by 0 days.

(21) Appl. No.: 12/094,025

(22) PCT Filed: Jun. 30, 2006

(86) PCT No.: PCT/CN2006/001520

§ 371 (c)(1),
(2), (4) Date: May 16, 2008

(87) PCT Pub. No.: WO2007/093087

PCT Pub. Date: Aug. 23, 2007

(65) Prior Publication Data

US 2008/0294784 A1 Nov. 27, 2008

(30) Foreign Application Priority Data

Feb. 14, 2006 (CN) .................. 2006 1 0007491

(51) Int. Cl.
*G06F 15/16* (2006.01)
(52) U.S. Cl. ..................................... 709/228; 709/227
(58) Field of Classification Search ......... 709/227–228, 709/238, 224
See application file for complete search history.

(56) References Cited

U.S. PATENT DOCUMENTS

| | | | |
|---|---|---|---|
| 6,219,706 B1 * | 4/2001 | Fan et al. ................... | 709/225 |
| 6,757,255 B1 * | 6/2004 | Aoki et al. .................. | 370/252 |
| 7,529,246 B1 * | 5/2009 | Singh et al. ................. | 370/394 |
| 2005/0078600 A1 | 4/2005 | Rumisel et al. | |
| 2005/0283529 A1 * | 12/2005 | Hsu et al. ................... | 709/224 |

(Continued)

FOREIGN PATENT DOCUMENTS

CN 1558638 A 12/2004

(Continued)

OTHER PUBLICATIONS

International Search Report from corresponding International Application No. PCT/CN2006/001520, filed Jun. 30, 2006. Report dated Dec. 14, 2006.

*Primary Examiner*—Hussein A Elchanti
(74) *Attorney, Agent, or Firm*—Quarles & Brady LLP

(57) ABSTRACT

The present invention discloses a method for synchronizing connection state in data communication, which includes: a node requests connection state information from an opposite node connected with it and the node updates the local connection state according to the connection state information returned by the opposite node. The invention further discloses a communication node using the method. In the invention, by synchronizing the connection state information between a node that may be out of synchronization and its opposite node connected, the problem of connection state synchronization may be solved substantially, and synchronization may be recovered simply by holding the connection. Further, according to the embodiment of the invention, frequent connection state synchronization inside a high-availability system is no longer necessary, so that system bandwidth and processing capability may be saved, and the original connection may be recovered at any moment when an active/standby switching occurs.

16 Claims, 6 Drawing Sheets

U.S. PATENT DOCUMENTS

2006/0137009 A1* 6/2006 Chesla .................. 726/22
2006/0153225 A1* 7/2006 Kamiya ................. 370/463
2008/0288656 A1* 11/2008 Forrester ............... 709/238

FOREIGN PATENT DOCUMENTS

| CN | 1567919 | 1/2005 |
| CN | 1606253 | 4/2005 |

* cited by examiner

METHOD FOR SYNCHRONIZING CONNECTION STATE IN DATA COMMUNICATION, AND COMMUNICATION NODE USING THE SAME

FIELD OF THE INVENTION

The present invention relates to the technical field of network and communications, in particular, to a method for synchronizing connection state in data communication and a communication node using the method.

BACKGROUND OF THE INVENTION

TCP (Transmission Control Protocol) is the most common transmission layer protocol used in the current network world, which provides reliable data transmission between two points on the Internet. At present, the most popular protocols, such as Telnet, FTP (File Transfer Protocol), HTTP (Hyper Text Transfer Protocol) and so on, are all based on TCP technology. TCP is a connection-oriented protocol. TCP connection should be established before data are transmitted between two network nodes, and the data transmission is performed according to the current TCP connection state.

As the important applications running on the network become more and more, various key network nodes generally employ a high-availability system that works in active/standby switching mode to reduce the down time. In FIG. 1, node B is a distributed device that includes an active board and a standby board, and a TCP connection is established between node B and node A. During normal operations, the logical TCP connection between node A and node B is actually accomplished by the active board of node A and node B. When a problem occurs on the active board, the standby board takes over the active board.

For a TCP connection, before the original TCP connection is continued, the standby board must know the connection state during active/standby switching, such as the sequence number that has been used by the sending party and the receiving party; otherwise, the standby board has to reestablish a new TCP connection with node A. However, the reestablishment of a TCP connection may cause serious problems in some cases; for example, node A and node B are two routers, and the TCP connection is used for bearing BGP (Border Gateway Protocol), once a TCP connection is reestablished, Route Oscillation may be caused for a period of time. Therefore, the state synchronization of TCP connection becomes the key of the problem.

In the prior art, two methods are usually employed to synchronize TCP connection state. Taking node A and node B in FIG. 1 as an example again, the first synchronization method is as shown in FIG. 2, each time a TCP message is transmitted between node A and the active board of node B, the active board notifies the standby board of the TCP connection state information contained in each message via a TCP synchronization message between the active board and the standby board, thus the standby board may continue the original TCP connection via the backup connection state information. The second synchronization method is as shown in FIG. 3, the active board of node B duplicates the TCP message received from node A and transmits it to the standby board, and similarly, the active board of node B duplicates the message that is sent to node A and transmits it to the standby board, and the standby board keeps the TCP connection state synchronized with that of the active board according to the duplicated message received from the active board.

These two methods may solve the problem of TCP connection state synchronization to a certain degree, but may not be effective in all cases. Because the active board may generate synchronization information or duplicate the message and send it to the standby board only after a TCP message from node A is received; and even if the active board sends the duplicated message or synchronization information to the standby board while it sends the TCP message to node A, considering that the active board needs to process heavy service load at the same time, it is difficult to guarantee that the two sending processes are implemented simultaneously according to the process scheduling mechanism of the operating system; in other words, it is basically inevitable that a certain time difference will exist between the message transmission of node A and node B and the state synchronization of the active/standby board. Moreover, in the case that the active board fails, the time when active/standby switching occurs is uncontrollable, and the standby board may take over the active board at any moment. Therefore, whether the standby board is capable of successfully continuing the original TCP connection depends on whether the state synchronization condition is consistent with the message transmission condition when switching occurs. Once the two conditions are inconsistent, the original TCP connection state is unable to be recovered, and a TCP connection has to be reestablished between node A and node B.

Further, these two methods both require that real-time synchronization of TCP connection may be realized between the active board and the standby board, thus a large amount of information are transmitted between the active board and the standby board, which causes a large amount of bandwidth between the active board and the standby board and CPU (Central Process Unit) resources may be consumed, so that the device performance may be degraded.

SUMMARY OF THE INVENTION

An embodiment of the invention provides a method for synchronizing connection state in data communication and a network node device using the method, so that timely and reliable active/standby switching may be realized, and the reliability and security of network communication may be improved.

In one aspect of the invention, there provides a method for synchronizing connection state in data communication, which includes:

a node requests connection state information from an opposite node connected with it; and the node updates the local connection state according to the connection state information returned by the opposite node.

The node includes a first communication unit and at least one second communication unit;

Before the node requests the connection state information from the opposite node, the first communication unit notifies the second communication unit of the connection parameters of the connection with the opposite node.

The process in which the node requests the connection state information from the opposite node includes: after taking over the first communication unit to connect with the opposite node, one second communication unit requests the connection state information from the opposite node according to the connection parameters; and the second communication unit updates the local connection state according to the connection state information returned by the opposite node.

The connection parameters include a source IP address, a destination IP address, a source port number and a destination port number.

The process of requesting the connection state information from the opposite node and updating the local connection state according to the connection state information returned is performed by the first communication unit or the second communication unit that is connected with the opposite node currently.

The connection state information include a local sequence number and an opposite sequence number.

Preferably, the method further includes:

the node sends a local window value while requesting the connection state information from the opposite node; and the connection state information returned from the opposite node includes the window value of the opposite node.

After updating the local connection state, the node acknowledges the connection state synchronization to the opposite node.

Preferably, the message for requesting the connection state information from the opposite node is in the format of the first SYN (Synchronization) message of the connection established via TCP; and the message for acknowledging the connection state synchronization is in the format of the third SYN message of the connection established via TCP.

An embodiment of the invention further provides another method for synchronizing connection state in data communication, which includes:

a node with a connection having been established receives a connection state information request from an opposite node; and the node returns the current local connection state information to the opposite node.

Preferably, before returning the connection state information to the opposite node, the node suspends the data transmission on the connection after receiving the connection state information request from the opposite node.

The connection state information request from the opposite node includes the window size of the opposite node;

the node updates the local opposite window size according to the window value in the connection state information request from the opposite node; and the current connection state information returned to the opposite node include an opposite sequence number, a local sequence number and a local window size that are recorded locally.

Preferably, the current connection state information is returned to the opposite node in the format of the second SYN message of the connection established via TCP, in which the acknowledge sequence number field is the opposite sequence number recorded locally.

In another aspect of the invention, there provides a communication node, which includes a connection module and a synchronization request module, wherein:

the connection module is adapted to communicate via a connection with an opposite node; and the synchronization request module is adapted to send a connection state information request to the opposite node via the connection module, synchronize and update the local connection state according to the connection state information received from the opposite node by the connection module.

In the communication node, the local connection state information is set the same as the connection state information received; and the connection state information synchronization is acknowledged to the opposite node via the connection module.

The connection state information request includes a local window size; and the connection state information received include a local sequence number, an opposite sequence number and an opposite window size that are recorded by the opposite node.

An embodiment of the invention further provides another communication node, which includes a first communication unit and at least one second communication unit, wherein:

the first communication unit sends the connection parameters of the connection with an opposite node to the second communication unit; and the second communication unit establishes a connection with the opposite node according to the connection parameters, sends a connection state information request to the opposite node, and updates the connection state according to the connection state information received from the opposite node.

Preferably, the connection state information of the current unit is set the same as the connection state information received; and the connection state synchronization is acknowledged to the opposite node.

The connection state information received from the opposite node include a local sequence number and an opposite sequence number recorded by the opposite node; and the connection parameters include a source IP address, a destination IP address, a source port number and a destination port number.

An embodiment of the invention further provides another communication node, which includes a connection module and a synchronization response module, wherein:

the connection module is adapted to communicate via a connection with an opposite node; and the synchronization response module is adapted to receive the connection state information request from the opposite node that is output from the connection module, and send the current local connection state information to the opposite node via the connection module.

The communication node further includes a communication control module, which is adapted to suspend the data communication of the connection module after the connection module receives a connection state information request from the opposite node, and continue the data communication of the connection module after the connection module receives a connection state synchronization acknowledge from the opposite node.

The current local connection state information include an opposite sequence number, a local sequence number and a local window size that are recorded locally.

An embodiment of the invention provides a computer program for realizing connection state synchronization in data communication. The computer program is stored in a communication node, so that the communication node may perform the following procedures:

requesting the connection state information from an opposite node connected with the communication node; and updating the local connection state according to the connection state information returned from the opposite node.

In the computer program, the communication node concerned includes an active communication unit and a standby communication unit. The standby communication unit requests the connection state information from the opposite node according to the connection parameters provided by the active communication unit, and then updates the local connection state according to the connection state information obtained.

The connection parameters concerned include a source IP address, a destination IP address, a source port number and a destination port number.

The connection state information concerned include a local sequence number and an opposite sequence number.

The communication node sends a local window value while requesting the connection state information from the opposite node; and the connection state information returned by the opposite node includes the window value of the opposite node.

After updating the local connection state, the node acknowledges the connection state synchronization to the opposite node.

The message for requesting the connection state information from the opposite node is in the format of the first SYN message of the connection established via TCP; and the message for acknowledging the connection state synchronization is in the format of the third SYN message of the connection established via TCP.

An embodiment of the invention further provides another computer program for realizing connection state synchronization in data communication. The computer program is stored in a communication node, so that the communication node may perform the following procedures:

a connection state information request is received from an opposite node that has established a connection with the current communication node; and the communication node returns the current local connection state information to the above opposite node.

Before returning the connection state information to the opposite node, the node suspends the data transmission on the connection after receiving the connection state information request from the opposite node.

The connection state information request from the opposite node includes the window size of the opposite node;

the node updates the local opposite window size according to the window value in the connection state information request from the opposite node; and the current connection state information returned to the opposite node include an opposite sequence number, a local sequence number and a local window size that are recorded locally.

The current connection state information is returned to the opposite node in the format of the second SYN message of the connection established via TCP, in which the acknowledge sequence number field is the opposite sequence number recorded locally.

In the invention, by synchronizing the connection state information between a node that may be out of synchronization and an opposite node connected with the node, the problem of connection state synchronization may be solved substantially, i.e., the synchronization may be recovered only if the connection remains. Further, in the invention, timely and reliable active/standby switching may be realized without the frequent connection state synchronization inside a high-availability system. Therefore, the system bandwidth and processing capability may be saved, and the original connection may be recovered at any moment when an active/standby switching occurs. In this way, the reliability and security of network communication may be improved.

DETAILED DESCRIPTION OF THE EMBODIMENTS

In the prior art, the connection state synchronization of high-availability systems all aims to realize strict state synchronization between active and standby boards, so that the standby board may keep synchronous with the active board and successfully take over the active board to communicate with the opposite node when switching occurs. However, in connection-oriented data transmission, the condition that the connection with the opposite node may be switched to the standby board from the active board and the data transmission may be continued, is that the connection state of the standby board is synchronous with that of the opposite node, rather than being consistent with the connection state of the active board. If the connection state of the active board is not synchronous with that of the opposite node when switching occurs due to a certain reason, the connection may still be interrupted even if the connection state of the standby board is completely consistent with the connection state of the active board. Considering that the connection state of the opposite node actually is the object of local synchronization and the connection state is irrelevant to the local active/standby switching, connection state synchronization will be realized between the standby board and the opposite node, rather than performing local state backup with heavy workload, which also depends on whether the time switching occurs is just the time when the states of the opposite node, the active board and the standby board are synchronous. Therefore, such a problem may be solved fundamentally.

Hereinafter, synchronization request node is a node at one end of the connection that needs to synchronize the connection state with an opposite node, while synchronization response node is the opposite node that sends the local connection state information as requested by the synchronization request node. In practical applications, the synchronization request node is usually a high-availability system, such as a router including an active board and a standby board, a cluster including a plurality of servers which operates as a single logic entity. The synchronization response node may be a single device, and it may also be a high-availability system.

To make the principles, characteristics and advantages of the invention more apparent, the invention will now be further described in detail in conjunction with the specific embodiments.

It is assumed that the synchronization request node is a high-availability system, which includes a first communication unit and at least one second communication unit, wherein the first communication unit is a unit that has a connection relation with the opposite node. A certain second communication unit will take over the first communication unit to connect with the opposite node and continue to bear the data transmission on the connection.

Figure 4:
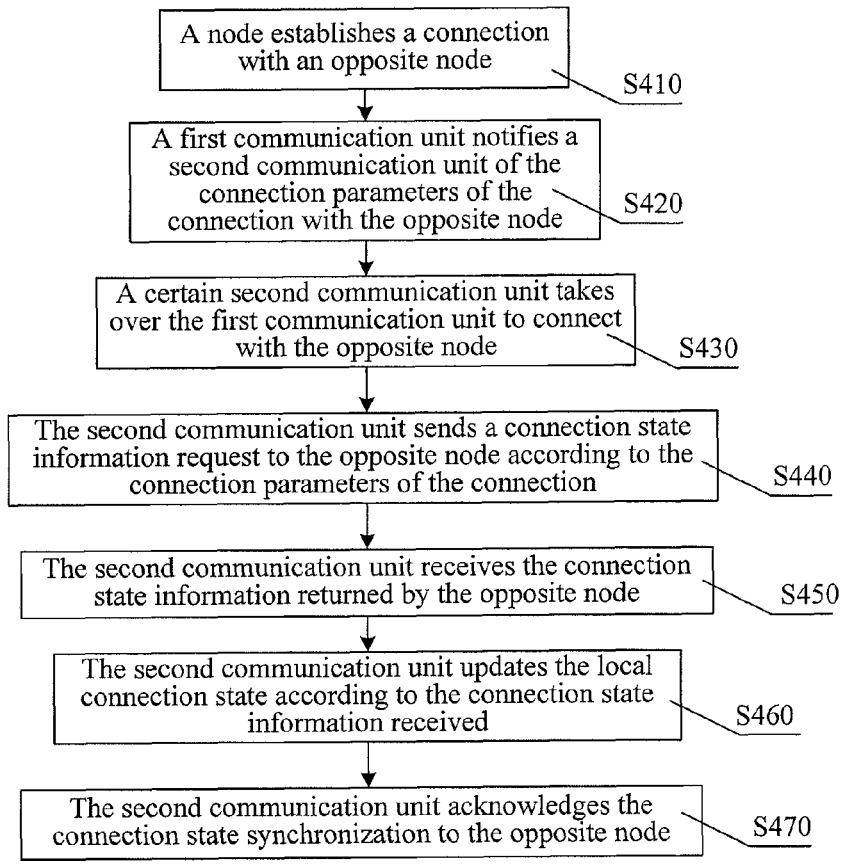
FIG. 4 is a flow chart of a synchronization request node according to one embodiment of the invention.

The flow of the synchronization request node in the embodiment is as shown in FIG. 4, which includes the following operation steps:

Step S410: The current node establishes a connection with its opposite node. In the embodiments of the invention, the connection state synchronization occurs in the case that a connection has been established.

When TCP protocol is employed, a TCP connection needs to be established between two communication nodes before data transmission is carried out. A TCP connection may be determined uniquely by IP (Internet Protocol) addresses and port numbers for identifying the sending and receiving application processes of the two parties of the connection. Therefore, source IP address, destination IP address, source port number and destination port number are usually taken as the connection parameters of the TCP connection.

Step S420: At a certain time after the connection is established, the connection on the nodes exists between a first communication unit and the opposite node. The first communication unit notifies a second communication unit of the connection parameters of the connection, so that the second communication unit may recover the connection by means of the connection parameters when switching occurs.

Step S430: The second communication unit takes over the first communication unit to connect with the opposite node. At this time, the connection parameters of have already been recorded in the second communication unit locally.

The time when the second communication unit takes over the first communication unit for connection is related to the working mode of the synchronization request node, which may occur when the first communication unit fails or as required for load equalization even when the first communication node works normally. When there are more than one second communication units, it is determined by the switching setting in the synchronization request node that which second communication unit takes over the first communication unit for connection.

The second communication unit takes over the first communication unit for TCP connection by the same connection parameter. It means that the second communication unit must use the IP address of the first communication unit. In the case that the first communication unit still works normally, the synchronization request node should guarantee that the two units may respectively carry out connection-oriented communication with their opposite nodes using the same IP address.

Step S440: The second communication unit sends a connection state information request to the opposite node according to the connection parameters of the connection to be switched. For TCP protocol, the connection state information include a local sequence number and an opposite sequence number, also include local and opposite window size.

Figures 5, 6:
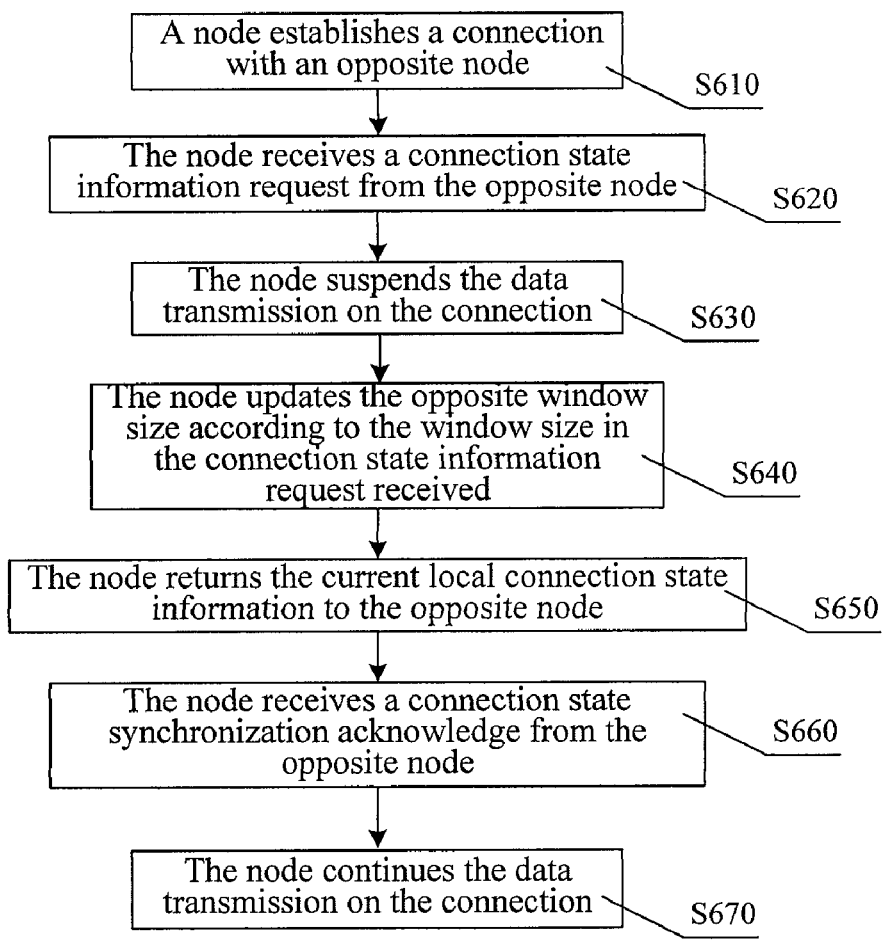
FIG. 5 is a structural diagram of a TCP message field in TCP/IP protocol.
FIG. 6 is a flow chart of a synchronization response node according to one embodiment of the invention.

The field structure of a TCP header in a TCP/IP message is as shown in FIG. 5. The 16-bit source port number is the port number of the sender; the 16-bit destination port number is the port number of the receiver. These two fields together with the source IP address and the destination IP address in the IP header are taken as the connection parameters of the TCP connection.

The sender and receiver applications exchange an 8-bit byte stream via the TCP connection. Each end node of the TCP connection counts the byte stream sent locally and received from the opposite node respectively via the sequence number and the acknowledge sequence number. The 32-bit sequence number represents the sequence number used by the sender of the message in the first data byte of the message, while the 32-bit acknowledge sequence number represents the sequence number of the next data byte sent by the opposite node that is expected by the end for receiving acknowledge, i.e., the sender of the message. The data byte is the payload part that is transmitted via the TCP connection.

The 16-bit window size is used for providing flow control to TCP connection, which represents the buffer size of the sender of the message, i.e., the amount of data that may be received from the opposite node. The two end nodes of the TCP connection may also negotiate the window size beyond 16-bit via a window expansion option.

The 4-bit header length is the total length of the TCP message, and there are 6 flag bits following the 6-bit reserved field; in the 6 flag bits, SYN (Synchronization) flag bit is used in the existing TCP for representing that a connection is initiated, and ACK (Acknowledge) flag bit represents that the 32-bit acknowledge sequence number field is valid. Because an acknowledge mechanism is provided in TCP protocol, the ACK flag bit is always set.

It can be seen that, the second communication unit needs to know the local sequence number and opposite sequence number of the current TCP connection before it takes over the first communication unit to carry out the data transmission with the opposite node. At the same time, flow control may also be implemented by exchanging the current window size of each other during the connection state synchronization. Therefore, the second communication unit may place the information of the current local window size in a connection state information request message sent to the opposite node.

The first communication unit may place the current local sequence number in the connection state information request. Or, the local sequence number may be vacant, and then provided by the opposite node.

Referring to FIG. 4 again, in Step S450: The second communication unit receives the connection state information returned by the opposite node.

Step S460: The second communication unit updates the local connection state according to the connection state information received from the opposite node. For a TCP connection, the sequence number field of the TCP header in the message returned by the opposite node is the opposite sequence number, the acknowledge sequence number field is the local sequence number, and the window size field is the opposite window size.

Step S470 (optional): The second communication unit sends a connection state synchronization acknowledge to the opposite node.

The connection state synchronization acknowledge may be adapted to notify the opposite node to continue the data transmission; in the case that no connection state synchronization acknowledge is sent, the synchronization request node may start data transmission recovery, or the opposite node may continue the data transmission via a timeout mechanism after sending the connection state information; or, the above two modes may be used in combination as required.

After the connection state synchronization is accomplished, the node continues the data transmission of the original connection with the opposite node.

In this embodiment, after the connection switching is accomplished, the second communication unit may become the current first communication unit, and the communication unit in the high-availability system that may take over the current first communication unit may become the current second communication unit. Such a case is suitable for a high-availability system that has a stage-by-stage backup function or supports dynamic load equalization.

In the above embodiment, the flow of the synchronization response node is as shown in FIG. 6, including:

Step S610: A node establishes a connection with its opposite synchronization request node.

Step S620: The node receives a connection state information request from the opposite node. As described above, in the embodiment of the invention, the connection state synchronization occurs in the case that a connection has been established.

Step S630: The node suspends the data transmission on the connection. Because connection-oriented protocols usually employ acknowledge and retransmission timeout mechanism, unnecessary network flow may be avoided when the synchronization response node suspends the data transmission on the connection.

Step S640: When the connection state information request from the opposite node includes the opposite window size, the node updates the opposite window size in the local connection state information according to the received opposite window size.

Step S650: The node sends the current local connection state information to the opposite node as a response to its connection state information request.

The current TCP connection state information returned to the opposite node includes the local sequence number and opposite sequence number that are recorded by the node and acknowledged by the opposite node, so that the data transmission of the TCP connection may be continued from the accomplished byte stream before the opposite node sends the connection state information request. However, according to the communication mechanisms of the applications of the two communication parties, part of the byte stream that has already been transmitted may also be retransmitted. The TCP connection state information returned to the opposite node may further includes the current window size of the node.

Step S660: The node receives a connection state synchronization acknowledge from the opposite node. This step is also an optional step for cooperating with Step S470.

Step S670: The node continues the data transmission on the connection.

The method for synchronizing connection state according to another embodiment of the invention will now be described. In this embodiment, the synchronization request node and the synchronization response node may both be an individual device or a high-availability system. Here, the switching between different connection units inside the synchronization request node will not be considered, while the different connection units may be regarded as one unity the connection state of which is out of synchronization. For example, a plurality of units in the synchronization request node may establish a connection with the synchronization response node. If the sending process on the current connection unit is interrupted for some reasons, the connection will be still effective after the current connection unit restarts the sending process, but the connection state of the connection will be lost. At this time, no connection switching occurs, but the connection state synchronization still needs to be carried out.

The difference between this embodiment and the aforementioned embodiment lies in that the connection parameters of the synchronization request node are recorded locally, and the connection parameters of the connection do not need to be obtained before the connection state is synchronized.

In this embodiment of the invention, part flow of the synchronization request node is substantially consistent with that in the aforementioned embodiment, the detailed illustration of which may refer to the corresponding steps in the aforementioned embodiment, and will not be described here again. The flow of the synchronization response node is the same as that in the aforementioned embodiment.

Figure 7:
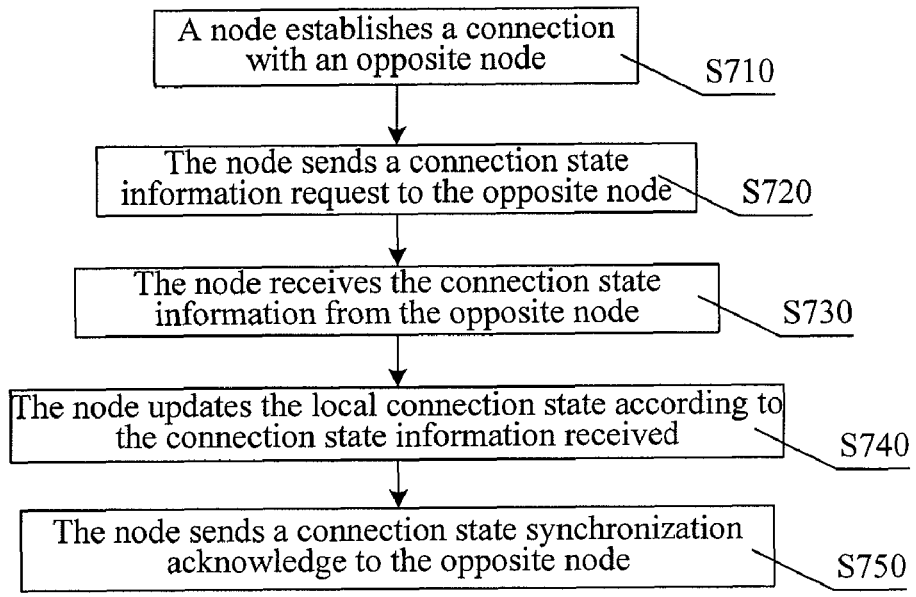
FIG. 7 is a flow chart of a synchronization request node according to another embodiment of the invention.

In this embodiment of the invention, the flow of the synchronization request node is as shown in FIG. 7. In particular, it includes the following operation steps:

Step S710: A node establishes a connection with its opposite node.

Step S720: When the node discovers that it may be out of synchronization or has been out of synchronization with the connection state of the opposite node, especially in the case that the out-of-synchronization is caused due to its own reasons, the node sends a connection state information request to the opposite node. When sending a connection state information request of the TCP connection, the node may place the local window size in the request message.

Step S730: The node receives the connection state information from the opposite node. The connection state information returned by the opposite node of the TCP connection includes the local sequence number and opposite sequence number of the current connection, also includes the opposite window size.

Step S740: The node updates the local connection state as to be consistent with the connection state information returned by the opposite node.

Step S750: The node sends a connection state synchronization acknowledge to the opposite node. Similarly, this step is an optional step.

After the connection state synchronization is accomplished, the node and the opposite node continue the data transmission of the original connection.

It is readily understood, in the previous embodiment, before the connection is switched by the synchronization request node, the first communication unit may perform connection recovery using the method of this embodiment; after the connection is switched, the second communication unit may also perform connection recovery using the method of this embodiment.

Figure 8:
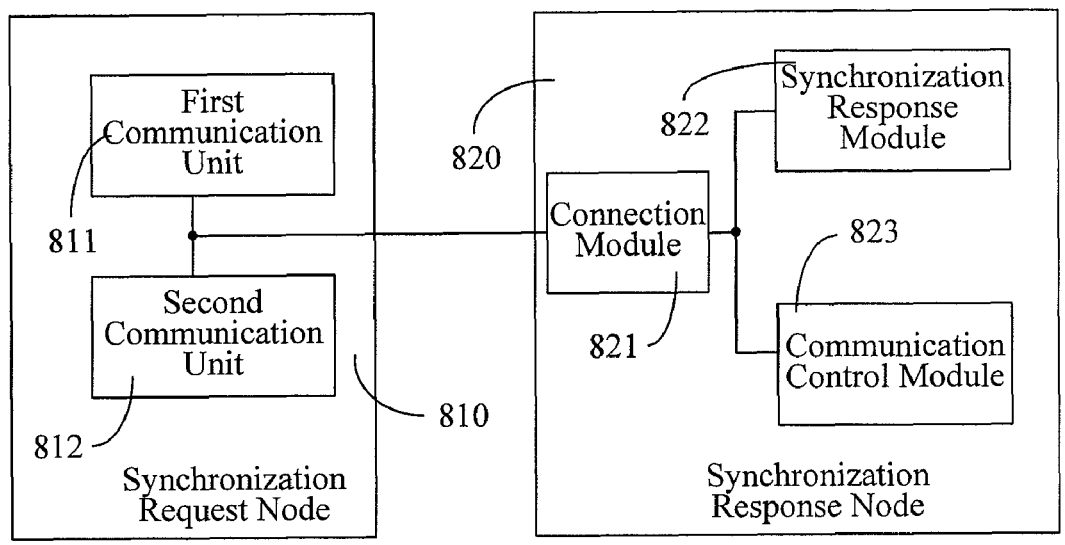
FIG. 8 is a structural diagram of a synchronization request node and a synchronization response node that employ the method for synchronizing connection state according to an embodiment of the invention.

FIG. 8 shows a structural diagram of the synchronization request node and the synchronization response node that employ the method for synchronizing a connection according to the embodiment of the invention. The Synchronization request node 810 includes a first communication unit 811 and a second communication unit 812 that are connected with each other, and both of them are connected to a connection module 821 of the synchronization response node 820. In addition to the connection module 821, the synchronization response node 820 further includes a synchronization response module 822 and a communication control module 823, and both of them are connected with the connection module 821. The synchronization request node 810 and the synchronization response node 820 are the opposite nodes for each other.

A connection exists between the first communication unit 811 and the connection module 821 of the synchronization response node 820, and the connection parameters of the connection are transmitted to the second communication unit 812. The connection parameters of a TCP connection include the source IP address, destination IP address, source port number and destination port number of the connection.

When taking over the first communication unit 811 to connect with the synchronization response node 820, the second communication unit 812 sends a connection state information request to the synchronization response node 820 using the connection parameters of the connection received from the first communication unit 811, and the window size of the current second communication unit 812 may be filled in the connection state information request.

The connection module 821 of the synchronization response node 820 and the synchronization request node 810 communicate with each other via the connection therebetween. After receiving a connection state information request from the second communication unit 812, the connection module 821 transmits the request to the synchronization response module 822. If the synchronization response node has a communication control module 823, the communication control module 823 will suspend the data transmission of the connection module 821.

The synchronization response module 822 transmits the current connection state information recorded locally to the connection module 821, and the connection module 821 replies to the second communication unit 812. For the connection state information request that includes the window size of the second communication unit 812, the synchronization response module 821 further updates the opposite window size in the local connection state as to be consistent with the window size received. The connection state information replied by the synchronization response node 820 includes the local sequence number and opposite sequence number it records, and also the local window size.

After receiving the connection state information from the synchronization response node 820, the second communication unit 812 performs connection state synchronization according to the connection state information. The second communication unit 812 updates the local connection state as to be consistent with the connection state information received. Then, as required by the particular application, the nodes of both communication parties may appoint whether the second communication unit 812 sends a connection state synchronization acknowledge to the synchronization response node 820.

In the case that the second communication unit 812 sends a connection state synchronization acknowledge, after the connection module 821 receives the connection state synchronization acknowledge, the communication control module 823 may recover the data transmission of the connection module 821.

Figure 9:
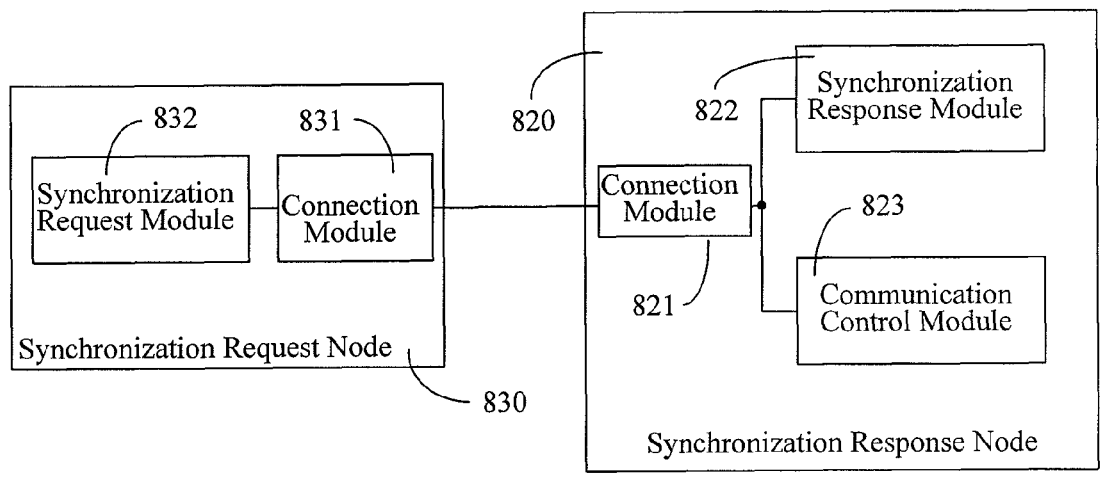
FIG. 9 is a structural diagram of a synchronization request node and a synchronization response node that employ the method for synchronizing connection state according to an embodiment of the invention.

FIG. 9 shows a structural diagram of the synchronization request node and the synchronization response node that employ the method for synchronizing a connection according to the embodiment of the invention. The synchronization request node 830 includes a connection module 831 and a synchronization request module 832 connected with each other, and the connection module 831 is connected to a connection module 821 of the synchronization response node 820. In addition to the connection module 821, the synchronization response node 820 further includes a synchronization response module 822 and a communication control module 823, and both of them are connected with the connection module 821. The synchronization request node 830 and synchronization response node 820 are opposite nodes for each other.

The connection module 831 of the synchronization request node 830 and the connection module 821 of the synchronization response node 820 communicate with each other via a connection therebetween. When the synchronization request node 830 considers that it may or has been out of synchronization with the connection state of the synchronization response node 820, the synchronization request module 832 transmits a connection state information request to the connection module 831, and the connection module 831 sends the connection state information request to the synchronization response node 820. In the connection state request, the window size of the current synchronization request node 830 may be filled.

After receiving the connection state information request from the synchronization request node 830, the connection module 821 of the synchronization response node 820 transmits the connection state information request to the synchronization response module 822. If the synchronization response node has a communication control module 823, then, the communication control module 823 will suspend the data transmission of the connection module 821.

The synchronization response module 822 transmits the current connection state information recorded locally to the connection module 821, and the connection module 821 replies to the synchronization request node 830. For the connection state information request including the window size of the synchronization request node 830, the synchronization response module 822 further updates the opposite window size in the local connection state as to be consistent with the window size received. The connection state information replied by the synchronization response node 820 includes the local sequence number and opposite sequence number it records, and also the local window size.

After receiving the connection state information from the synchronization response node 820, the connection module 831 of the synchronization request node 830 transmits the connection state information to the synchronization request module 832. The synchronization request module 832 synchronizes the connection state of the synchronization request node 830 according to the connection state information. The synchronization request module 832 updates the local connection state as to be consistent with the connection state information received. Then, as required by the particular application, the nodes of both communication parties may appoint whether the synchronization request module 832 sends a connection state synchronization acknowledge to the synchronization response node 820.

In the case that the synchronization request module 832 sends a connection state synchronization acknowledge, after the connection module 821 of the synchronization response node 820 receives the connection state synchronization acknowledge, the communication control module 823 may recover the data transmission of the connection module 821.

When the first communication unit 811 and second communication unit 812 of the synchronization request node 810 shown in FIG. 8 both support the method for synchronizing connection state in the embodiment 2, the first communication unit 811 and second communication unit 812 may respectively include a connection module and a synchronization request module for recovering the connection between the unit and the synchronization response node 820.

For the above embodiments of the method for synchronizing connection state, and the synchronization request node and synchronization response node in the application example, the connection state information request, the response for the connection state information request and the connection state synchronization acknowledge all need to be realized via the message transmitted on the connection. Further, the information exchanged between the two end nodes during the connection state synchronization is similar to those during the connection establishment; and the functions realized are similar too, since both of which are adapted to match the state information of the two connection parties and prepare for the subsequent data transmission. Therefore, in the embodiments of the invention, the message format for establishing a connection is recommended to be used for the message for synchronizing connection state, and the connection state information may be exchanged by filling different contents in the header field.

In TCP protocol, a Three-way Handshake process is employed to establish a TCP connection between two communication nodes. In the first Handshake, the node initiating the connection sends a first SYN message to the opposite node. In the first SYN message, the SYN flag bit is set and the ACK flag bit is cleared. The initial sequence number of the node initiating the connection is filled in the sequence number field, and the window size of the current node is filled in the window size field. If the opposite node expects to establish a connection with the node after receiving the first SYN message, a second SYN message is returned. In the second SYN message, the SYN flag bit and the ACK flag bit are set; the initial sequence number of the opposite node is filled in the sequence number field, and the initial sequence number of the node received plus 1 is filled in the acknowledge sequence number field so as to acknowledge the first SYN message; and the window size of the current opposite node is filled in the window size field. After receiving the second SYN message, the node initiating the connection sends a third SYN message to the opposite node. In the third SYN message, the ACK flag bit is set; the initial sequence number of the opposite node plus 1 is set in the acknowledge sequence number field so as to acknowledge the second SYN message; the window size of the current node is filled in the window size field. The TCP connection has been established with the above three SYN messages.

In the process of TCP connection synchronization, the connection state information request message may employ the format of the first SYN message, in which the sequence number being used by the synchronization request node currently is filled in the sequence number field, and if the sequence number being used currently is unknown, value 0 may be filled in; value 0 is filled in the acknowledge sequence number field; the SYN flag bit is set; the ACK flag bit is clear; and the current window size of the synchronization request node is filled in the window size field.

The connection state information response message replied by the synchronization response node may employ the format of the second SYN message, in which the sequence number being used by the synchronization response node currently is filled in the sequence number field; the sequence number of the synchronization request node recorded locally is filled in the acknowledge sequence number field; the SYN flag bit and the ACK flag bit are set; and the current window size of the synchronization response node is filled in the window size field.

The connection state synchronization acknowledge message of the synchronization request node may employ the format of the third SYN message, and the content filled in each field may also be the same as that of the third SYN message.

It should be noted that, in the embodiments of the invention, the connection state synchronization occurs in the case that a connection has been established. Therefore, the nodes of the both communication parties may determine whether the message is a message for establishing a connection or a message for synchronizing connection state depending on the condition of the connection when the above three messages are sent or received, so as to operate correspondingly. Additionally, in the prior art, when receiving the SYN message of a connection in the case that the connection has been established, the node at one end of the TCP connection usually terminates the connection using a reset message. However, according to the embodiments of the invention, the node that receives an SYN message in the case that a connection has been established should reply the connection state information to the opposite node.

Figure 10:
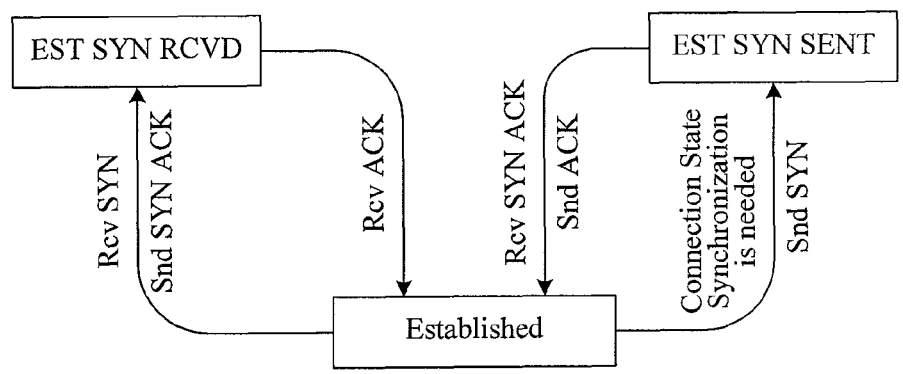
FIG. 10 is a schematic diagram of a TCP state machine added in the invention.

The state machine for synchronizing connection state after a TCP connection is established is as shown in FIG. 10. The TCP connection that has been established is in Established state. In order to differ from SYN RCVD state (i.e., the state that the SYN message has been received) and SYN SENT state (i.e., the state that the SYN message has been sent) in the process of connection establishment, in the process of connection state synchronization, it is referred to as EST SYN RCVD state (i.e., the state that the SYN message has been received with the connection established) and EST SYN SENT state (i.e., the state that the SYN message has been sent with the connection established).

When the connection state needs to be synchronized, the node in Established state enters EST SYN SENT state after sending a connection state information request message, synchronizes the connection state after receiving a connection state information response message from the opposite node, and then returns to the Established state after sending a connection state synchronization acknowledge message. When receiving a connection state information request message and returning a connection state information response message to the opposite node, the node in Established state enters EST SYN RCVD state; it then returns to the Established state after receiving a connection state synchronization acknowledge message from the opposite node.

A computer program, according to the embodiments of the invention, is designed for realizing connection state synchronization in data communication. The computer program is stored in a communication node, so that the communication node may perform the following steps:

Making request for the connection state information from the opposite node connected with the communication node; and Updating the local connection state according to the connection state information returned from the opposite node.

In the computer program, the communication node concerned includes an active communication unit and a standby communication unit. The standby communication unit requests the connection state information from the opposite node according to the connection parameters provided by the active communication unit, and then updates the local connection state according to the connection state information obtained.

The connection parameters concerned include a source IP address, a destination IP address, a source port number and a destination port number.

The connection state information concerned include a local sequence number and an opposite sequence number.

The communication node sends the local window value to the opposite node while requesting the connection state information from it;

The connection state information returned from the opposite node includes the window value of the opposite node.

After updating the local connection state, the node acknowledges the connection state synchronization to the opposite node.

The message for requesting the connection state information from the opposite node employs the format of the first SYN message of the connection established via TCP;

The message for acknowledging the connection state synchronization employs the format of the third SYN message of the connection established via TCP.

Another computer program, according to the embodiments of the invention, is also provided for realizing connection state synchronization in data communication. The computer program is stored in a communication node, so that the communication node may perform the following steps:

Receiving a connection state information request from the opposite node that has established a connection with this communication node; and Returning the current local connection state information to the opposite node.

When receiving the connection state information request from the opposite node, the communication node suspends the data transmission on the connection before returning the connection state information to the opposite node.

The connection state information request from the opposite node includes the window size of the opposite node;

the node updates the local opposite window size according to the window value in the connection state information request from the opposite node; and the current connection state information returned to the opposite node include the opposite sequence number, local sequence number and local window size that are recorded locally.

The current connection state information is returned to the opposite node in the format of the second SYN message of the connection established via TCP, in which the acknowledge sequence number field is the opposite sequence number recorded locally.

The invention application will now be illustrated by two particular examples.

APPLICATION EXAMPLE 1

Figure 1:
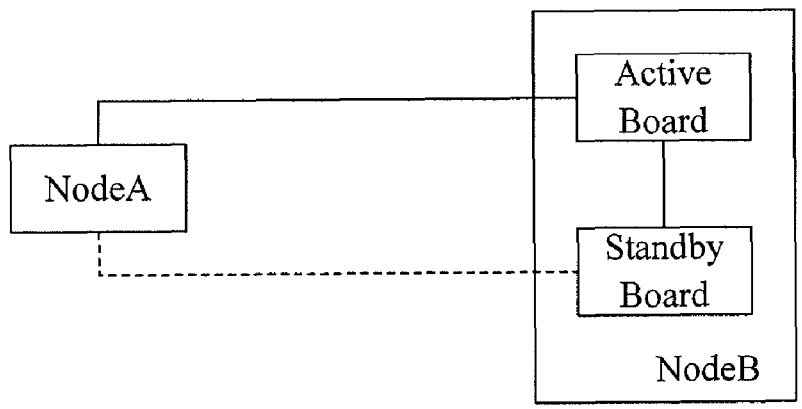
FIG. 1 is a schematic diagram of a TCP connection of a high-availability system.
Figure 2:
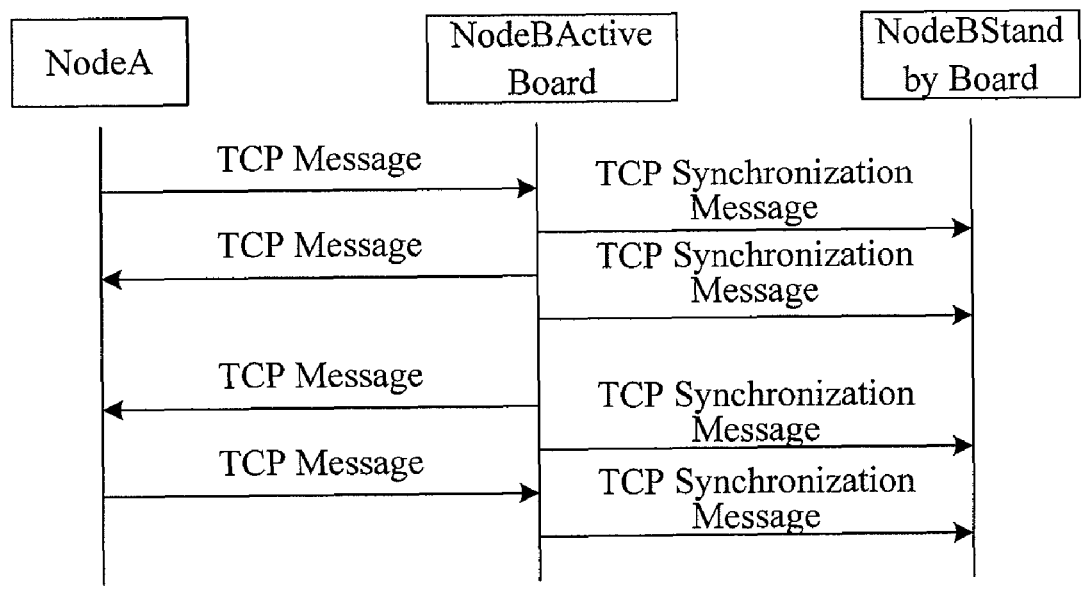
FIG. 2 is a schematic diagram of a first method for synchronizing connection state in the prior art.
Figure 3:
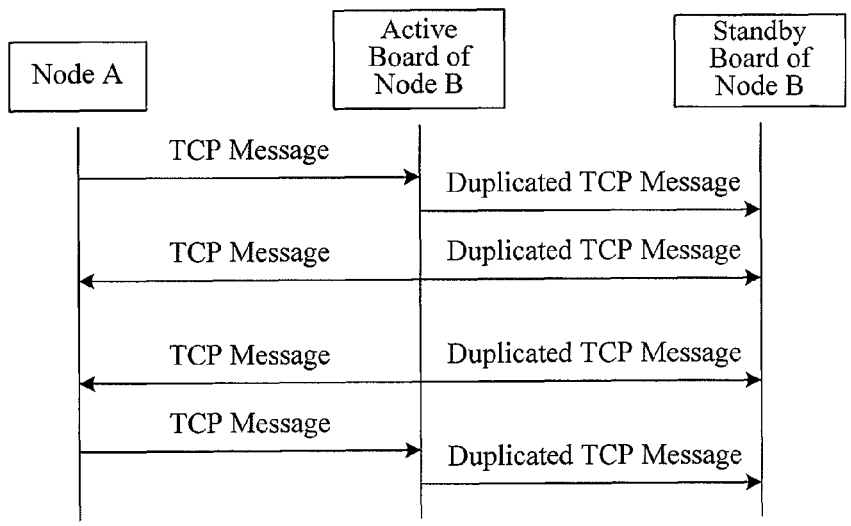
FIG. 3 is a schematic diagram of a second method for synchronizing connection state in the prior art.
Figure 11:
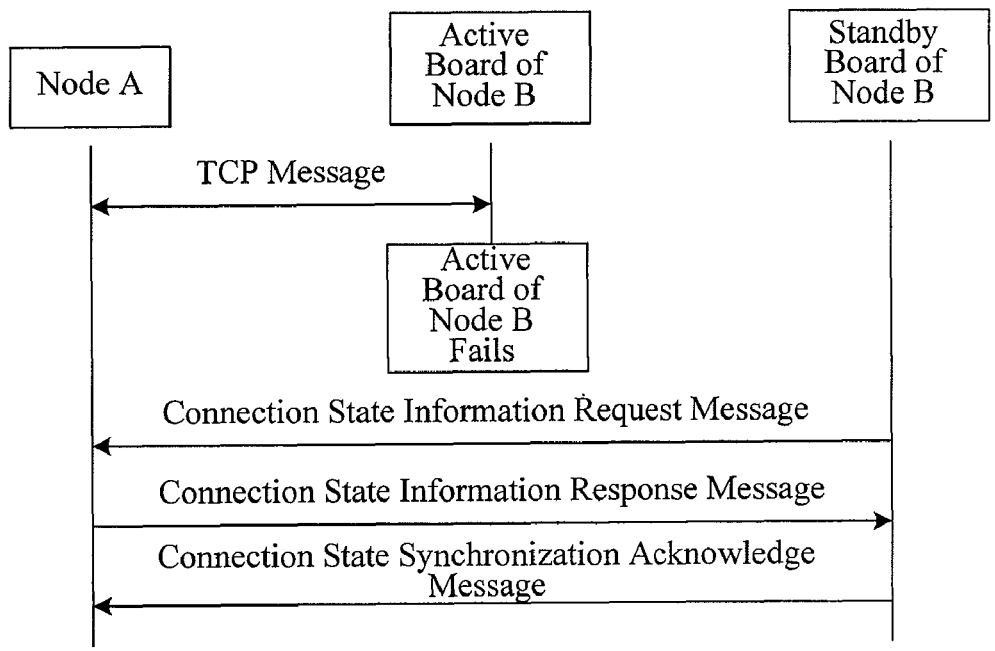
FIG. 11 is a flow chart of messages for connection state synchronization in one application example of the invention.
Figure 12:
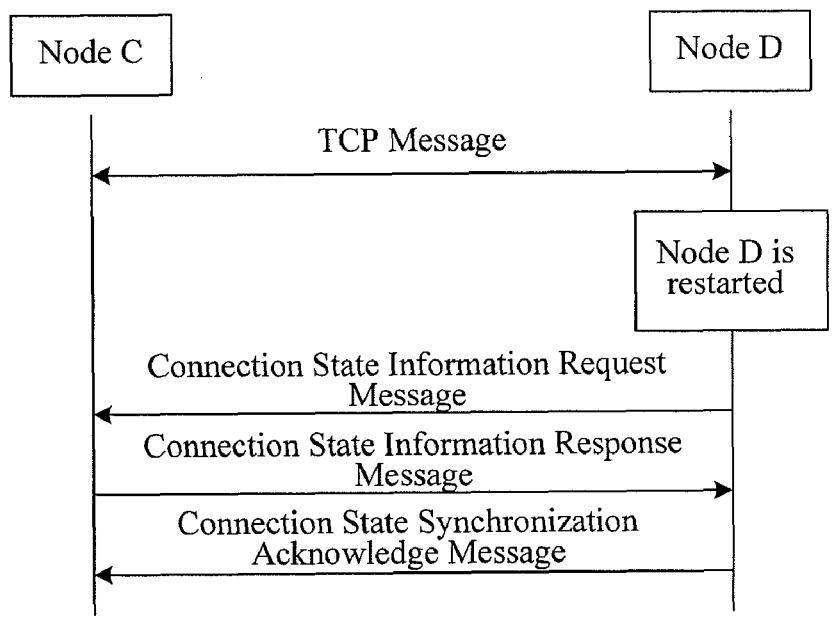
FIG. 12 is a flow chart of messages for connection state synchronization in another application example of the invention.

Refer to the TCP connection of a distributed system shown in FIG. 1, and the flow of its connection state synchronization shown in FIG. 11. When a fault occurs on the active board of a node B, the standby board takes over the active board to operate. Simply by knowing the destination IP address, source IP address, destination port number and source port number of the original TCP connection, the standby board may send a connection state information request message to a node A, receive a connection state information response message from the node A, and then send a connection state synchronization acknowledge message to the node A. In this way, the connection state synchronization process may be accomplished. Subsequently, the node B may continue the data transmission with the node A. This process is almost imperceptible to an upper-layer application.

APPLICATION EXAMPLE 2

Data transmission is carried out between a node C and a node D via a TCP connection. When the node C or the process therein is restarted, in the case that the destination IP address, source IP address, destination port number and source port number of the connection are still remained, the connection state may be synchronized by interacting the connection state information request message, connection state information response message and connection state synchronization acknowledge message with the node D, so that the TCP connection may be recovered. In other words, the restart behavior within a short time period in the node C will not affect the data transmission based on the connection.

It can be seen that, according to the embodiments of the invention, for the switching of a high-availability system at any moment and in various cases, the original connection may be continued; and for the connection state out of synchronization caused by a short-time fault in a centralized system, a recovery effect may be achieved. Additionally, in the embodiments of the invention, the connection parameters of the connection may be transmitted to the backup connection unit once, without a real-time synchronization of the connection state between each connection unit of the high-availability system. In this way, the processor and internal bandwidth of the high-availability system may be released to ensure the service processing capability of the system.

The above embodiments of the invention are not intended to limit the scope of the invention. Various modifications, equivalent alternations and improvements within the spirit and principle of the invention are contained in the claimed claims of the invention.

The invention claimed is:

1. A method for synchronizing connection state in data communication, comprising,
    notifying, by a first communication unit of a node which comprises the first communication unit and at least a second communication unit serving as a standby of the first communication unit, the second communication unit of the connection parameters of a connection between the node and an opposite node;
    requesting, by the second communication unit based on the connection parameters, connection state information from the opposite node by sending a connection state information request;
    receiving, by the opposite node with which the connection has been established, the connection state information request from the node;
    returning, by the opposite node, the current local connection state information to the node; and
    updating, by the second communication unit of the node, a local connection state according to the connection state information returned by the opposite node.

2. The method for synchronizing connection state according to claim 1, wherein, the connection parameters comprise a source IP address, a destination IP address, a source port number and a destination port number.

3. The method for synchronizing connection state according to claim 1, wherein, the connection state information comprises a local sequence number and an opposite sequence number.

4. The method for synchronizing connection state according to claim 3, further comprising, sending, by the node, a local window value while requesting the connection state information from the opposite node;

updating, by the opposite node, the local window size according to the window value in the connection state information request from the node;

wherein the connection state information returned by the opposite node comprises the window value of the opposite node.

5. The method for synchronizing connection state according to claim 1, wherein, after receiving the connection state information returned by the opposite node, the node acknowledges the connection state synchronization to the opposite node.

6. The method for synchronizing connection state according to claim 5, wherein, the message for requesting connection state information from the opposite node is in the format of the first SYN message of the connection established via TCP;

the message of responding to request of the node is in the format of the second SYN message of the connection established via TCP; and the message for acknowledging the connection state synchronization is in the format of the third SYN message of the connection established via TCP.

7. The method for synchronizing connection state according to claim 1, wherein, before returning the connection state information to the opposite node, the node suspends the data transmission on the connection when receiving the connection state information request from the opposite node.

8. A communication node, comprising a first communication unit serving as an active board and at least a second communication unit serving as a standby of the first communication unit, wherein the second communication unit comprises a connection module and a synchronization request module, wherein the first communication unit of the communication node notifies the second communication unit of the connection parameters of a connection between the communication node and an opposite node, and wherein, the connection module is adapted to communicate via a connection between the communication node and the opposite node; and the synchronization request module is adapted to request, based on the connection parameters, connection state information from the opposite node by sending a connection state information request to the opposite node via the connection module, synchronize and update the local connection state according to the connection state information receive from the opposite node by the connection module.

9. The communication node according to claim 8, wherein, the local connection state information is set the same as the connection state information returned by the opposite node; and the connection state information synchronization is acknowledged to the opposite node via the connection module.

10. The communication node according to claim 8, wherein, the connection state information request comprises a local window size; the connection state information returned by the opposite node comprise a local sequence number, an opposite sequence number and an opposite window size recorded by the opposite node.

11. A computer program product, for realizing connection state synchronization in data communication, wherein the computer program product is stored in a communication node comprising a first communication unit serving as an active board and a second communication unit serving as a standby of the first communication unit, so that the communication node may perform the following procedures:

notifying, by the first communication unit of the communication node, the second communication unit of the connection parameters of a connection between the communication node and an opposite node;

requesting, by the second communication unit based on the connection parameters, connection state information from the opposite node by sending a connection state information request; and updating, by the second communication unit of the node, a local connection state according to the connection state information returned by the opposite node.

12. The computer program product according to claim 11, wherein, the connection parameters comprise a source IP address, a destination IP address, a source port number and a destination port number.

13. The computer program product according to claim 12, wherein, the connection state information comprise a local sequence number and an opposite sequence number.

14. The computer program product according to claim 13, wherein, the communication node sends a local window value while requesting the connection state information from the opposite node; and the connection state information returned by the opposite node comprises the window value of the opposite node.

15. The computer program product according to claim 11, wherein, after updating the local connection state, the node acknowledges the connection state synchronization to the opposite node.

16. The computer program product according to claim 11, wherein, the message for requesting connection state information from the opposite node is in the format of the first SYN message of the connection established via TCP; and the message for acknowledging the connection state synchronization is in the format of the third SYN message of the connection established via TCP.

* * * * *